(12) United States Patent
Sanderson et al.

(10) Patent No.: US 11,891,129 B2
(45) Date of Patent: Feb. 6, 2024

(54) DUAL RACK ELECTRIC POWER STEERING SYSTEM FOR VEHICLE

(71) Applicant: Steering Solutions IP Holding Corporation, Saginaw, MI (US)

(72) Inventors: Rodney M. Sanderson, Midland, MI (US); Christopher A. Fall, Vassar, MI (US); Richard A. Light, Clio, MI (US); Troy M. Kinne, Midland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 488 days.

(21) Appl. No.: 17/166,720

(22) Filed: Feb. 3, 2021

(65) Prior Publication Data
US 2022/0242475 A1    Aug. 4, 2022

(51) Int. Cl.
*B62D 5/04*    (2006.01)
*B62D 3/12*    (2006.01)

(52) U.S. Cl.
CPC ............ *B62D 5/0427* (2013.01); *B62D 3/12* (2013.01); *B62D 5/0412* (2013.01); *B62D 5/0448* (2013.01)

(58) Field of Classification Search
CPC .. B62D 5/0427; B62D 5/0424; B62D 5/0421; B62D 5/04; B62D 5/0412; B62D 5/0409; B62D 5/0448; B62D 5/0445; B62D 5/0442; B62D 3/12; B62D 3/126
See application file for complete search history.

(56) References Cited

U.S. PATENT DOCUMENTS

| | | | | |
|---|---|---|---|---|
| 4,880,074 A * | 11/1989 | Matsumoto | ............ | B62D 5/008 180/444 |
| 6,695,092 B2 * | 2/2004 | Cole | ...................... | B62D 6/008 180/444 |
| 8,360,197 B2 * | 1/2013 | Escobedo | ............ | B62D 5/0454 180/407 |
| 2002/0063014 A1 * | 5/2002 | Yoshida | .............. | F16H 25/2223 180/444 |
| 2018/0362071 A1 * | 12/2018 | Zuzelski | ................ | B62D 3/126 |

FOREIGN PATENT DOCUMENTS

| | | | | |
|---|---|---|---|---|
| JP | 2016132430 A * | 7/2016 | | |
| WO | WO-2014115281 A1 * | 7/2014 | ............ | B62D 5/001 |
| WO | WO-2015178247 A1 * | 11/2015 | ............... | B62D 3/12 |
| WO | WO-2017014181 A1 * | 1/2017 | | |

* cited by examiner

*Primary Examiner* — Jacob D Knutson
*Assistant Examiner* — Abigail R Hymel
(74) *Attorney, Agent, or Firm* — Dickinson Wright PLLC

(57) ABSTRACT

A rack bar assembly for a rack electric power steering system is provided. The rack bar assembly includes a first rack bar extending axially. The rack bar assembly also includes a second rack bar extending axially, wherein the first rack bar and the second rack bar are spaced a radial distance from each other and oriented parallel to each other.

13 Claims, 5 Drawing Sheets

DUAL RACK ELECTRIC POWER STEERING SYSTEM FOR VEHICLE

BACKGROUND

The embodiments described herein relate to vehicle steering systems and, more particularly, to a dual rack electric power steering system.

Steering systems that employ a ball screw to convert rotary steering assist power into a linear output may be referred to as a rack assist electric power steering (REPS) system. A traditional REPS system for automotive applications requires a high load and a long range of translational rack travel (e.g., 75 mm), with both a rack tooth section and a ball screw section on the rack in-line. In other words, the tooth section and the ball screw section are sequentially disposed on the same rack. This tends to require large distances between a pair of inner ball joints, such as greater than 700 mm in some instances.

Some vehicle manufacturing and supplier applications may require a reduced inner ball joint-to-inner ball joint distance, such as below the 700 mm example noted above, but still desire similar rack travel capability. Typically, such an application would exclude use of the traditional style of REPS equipment.

SUMMARY

According to one aspect of the disclosure, a rack bar assembly for a rack electric power steering system is provided. The rack bar assembly includes a first rack bar extending axially. The rack bar assembly also includes a second rack bar extending axially, wherein the first rack bar and the second rack bar are spaced a radial distance from each other and oriented parallel to each other.

According to another aspect of the disclosure, a rack electric power steering system includes a steering input shaft receiving a manual input from an operator. The steering system also includes a pinion operatively coupled to the steering input shaft. The steering system further includes a ball nut driven by a motor. The steering system yet further includes a first rack bar having a tooth region in contact with the pinion, the first rack bar translated axially by the pinion. The steering system also includes a second rack bar having a ball screw region in contact with the ball nut, the second rack bar translated axially by the ball nut, wherein the first rack bar and the second rack bar are spaced a radial distance from each other, are of the same axial length, and are oriented parallel to each other. The steering system further includes a housing that is a single, integrally formed structure and contains at least a portion of the first rack bar and at least a portion of the second rack bar, the housing maintaining the radial distance between the first rack bar and the second rack bar.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
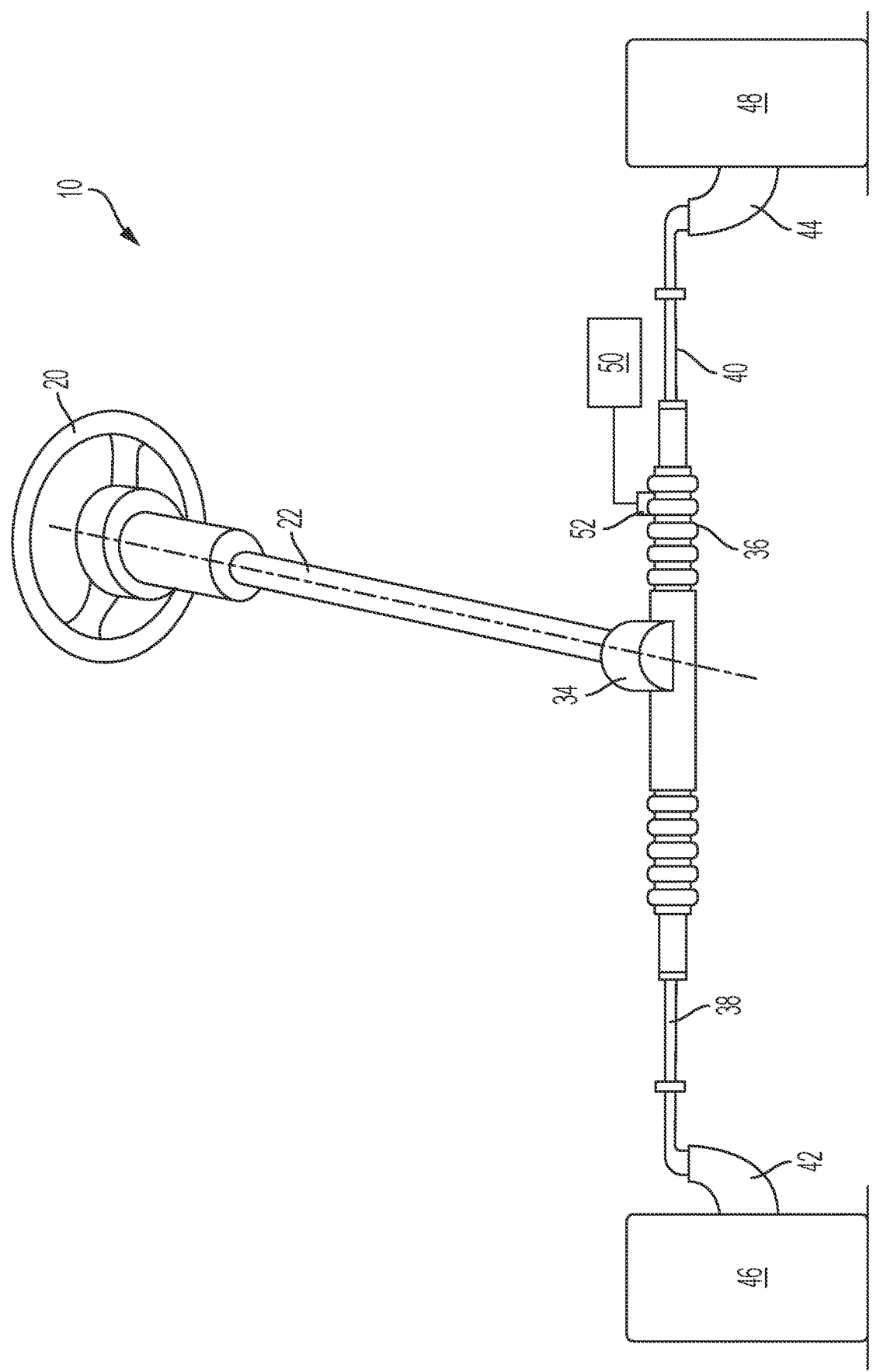
FIG. 1 is a schematic illustration of a vehicle steering system.

Referring now to the Figures, where the invention will be described with reference to specific embodiments, without limiting same, FIG. 1 illustrates a vehicle steering system 10 that is provided to steer a vehicle in a desired direction. The steering system 10 may include a hand wheel 20 operatively connected to a gear housing 34 via a steering column 22. The steering column 22 may be formed with one or more column sections, such as an upper column and a lower column, for example, but it is to be appreciated that various numbers of column sections may be employed.

The steering system 10 is an electric power steering system that utilizes a rack and pinion steering mechanism, which includes a rack bar assembly 36. The rack bar assembly 36 is only schematically illustrated in FIG. 1. The specific rack bar assembly details of the current disclosure is not shown in FIG. 1. In particular, and as will be appreciated from the disclosure, the rack bar assembly 36 includes a pair of rack bars arranged in parallel. Accordingly, the electric power steering system may be referred to as a dual rack electric power steering (DREPS) system. Also included are tie rods 38, 40, steering knuckles 42, 44, and road wheels 46, 48.

Figure 2:
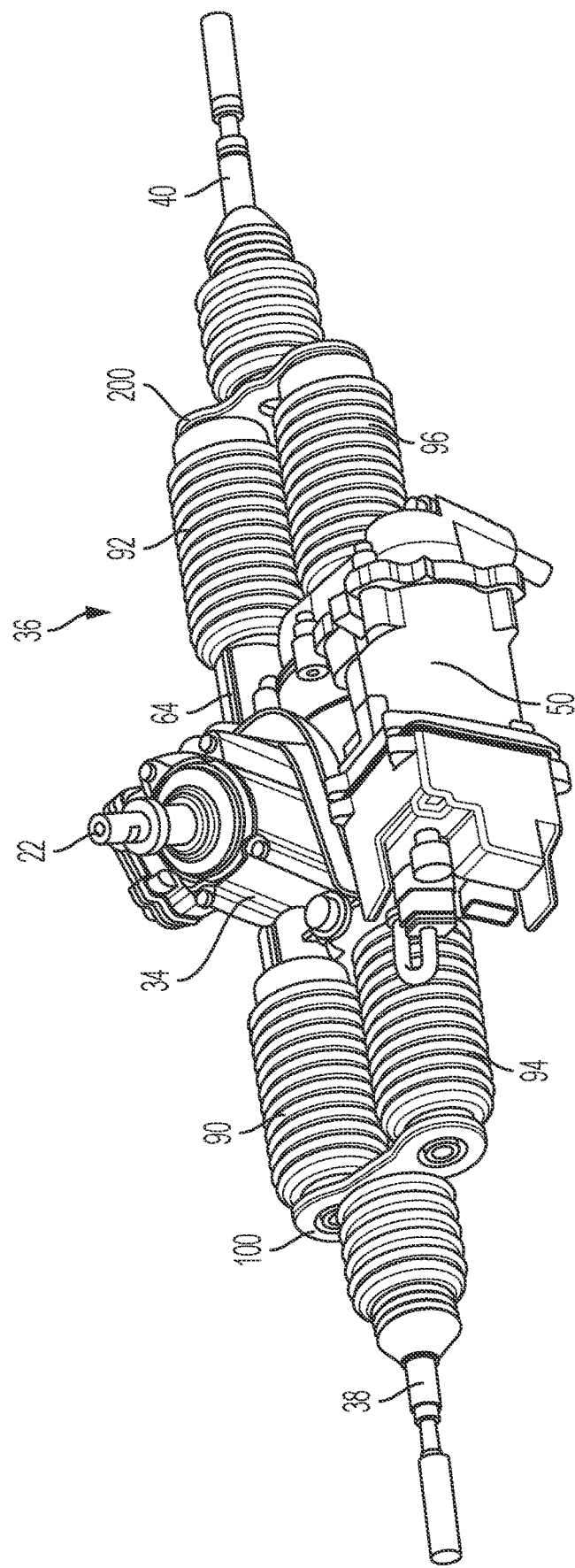
FIG. 2 is a perspective view of a dual rack electric power steering (DREPS) system.
Figure 3:
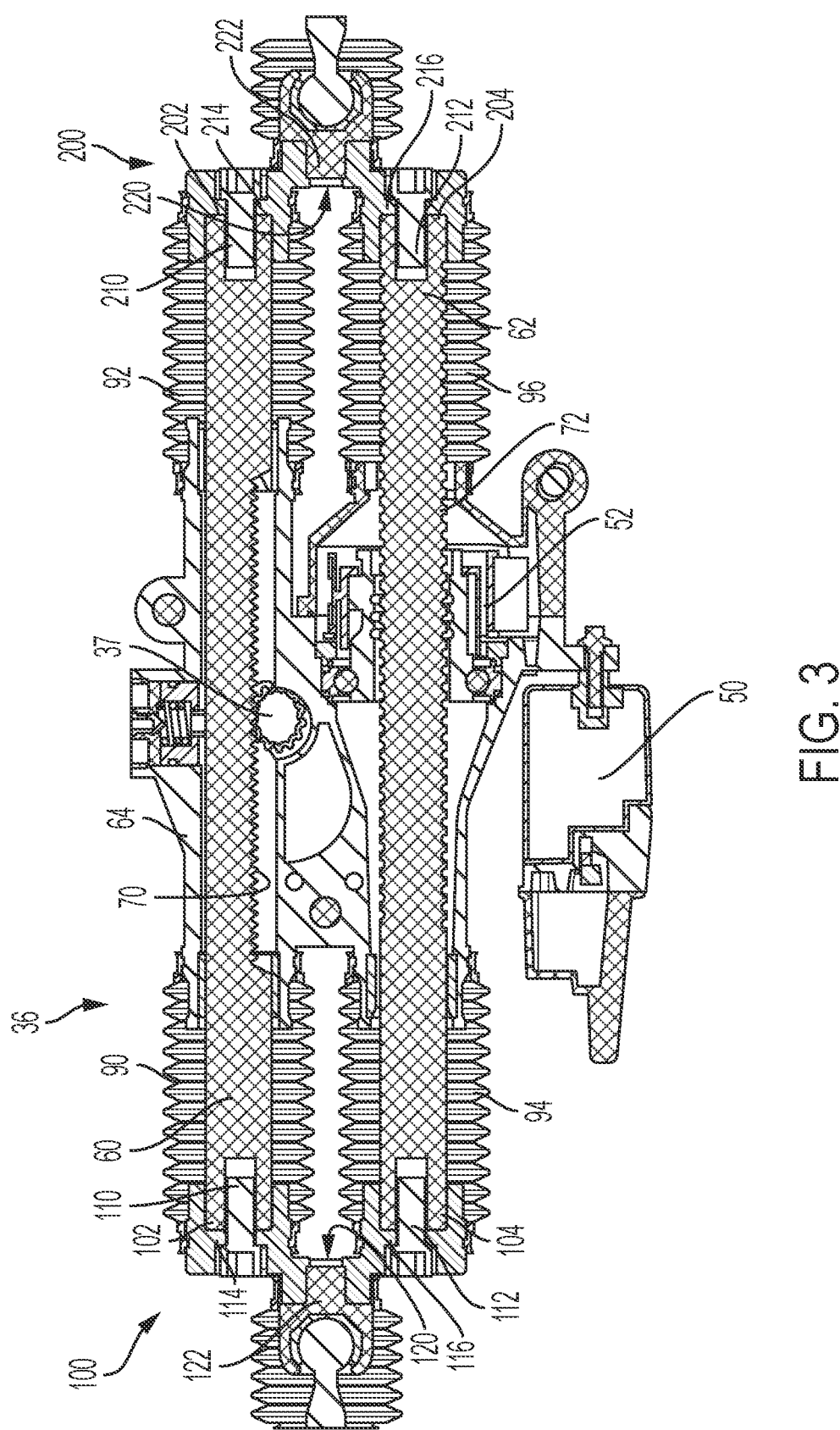
FIG. 3 is a perspective, cross-sectional view of the DREPS system.

Referring now to FIGS. 2 and 3, the rack bar assembly 36, and overall DREPS system, is illustrated in greater detail. The rack bar assembly 36 includes a first rack bar 60 and a second rack bar 62. The first rack bar 60 and the second rack bar 62 are oriented substantially parallel to each other, but are radially spaced from each other. In other words, the two rack bars 60, 62 are not axially in-line with each other. The rack bars 60, 62 are of a substantially equal axial length in some embodiments. The first rack bar 60 and the second rack bar 62 are structurally connected to each other with a housing 64. The housing 64 is a single, integrally formed structure in some embodiments. For example, the housing 64 may be a die cast component.

With continued reference to FIGS. 2 and 3, with general reference to FIG. 1, a pinion gear 37 is located under the gear housing 34. The first rack bar 60 includes a toothed region 70 for engagement or connection with the pinion gear 37. During operation, as the hand wheel 20 is turned by a vehicle operator, the steering column 22 turns the pinion gear 37. Rotation of the pinion gear 37 interacts with the toothed region 70 to move the first rack bar 60, which moves tie rods 38, 40. Tie rods 38, 40 in turn move respective steering knuckles 42, 44, which turn the respective road wheels 46, 48. Furthermore, in some embodiments a physical connection is not provided between the hand wheel 20 (or other steering input device) and a lower/forward portion of the steering column 22.

The steering system 10 also includes a power steering assist assembly that assists steering effort with a motor 50 that drives a ball-screw assembly. In particular, a nut 52 is engaged with a ball screw region 72 of the second rack bar 62 to assist with translation of the second rack bar 62. The ball screw region 72 is a region of the second rack bar 62 that includes a ball screw thread form that is kinematically engaged with the nut 52 through a series of balls in a recirculating ball circuit for powered steering assist.

Figure 4:
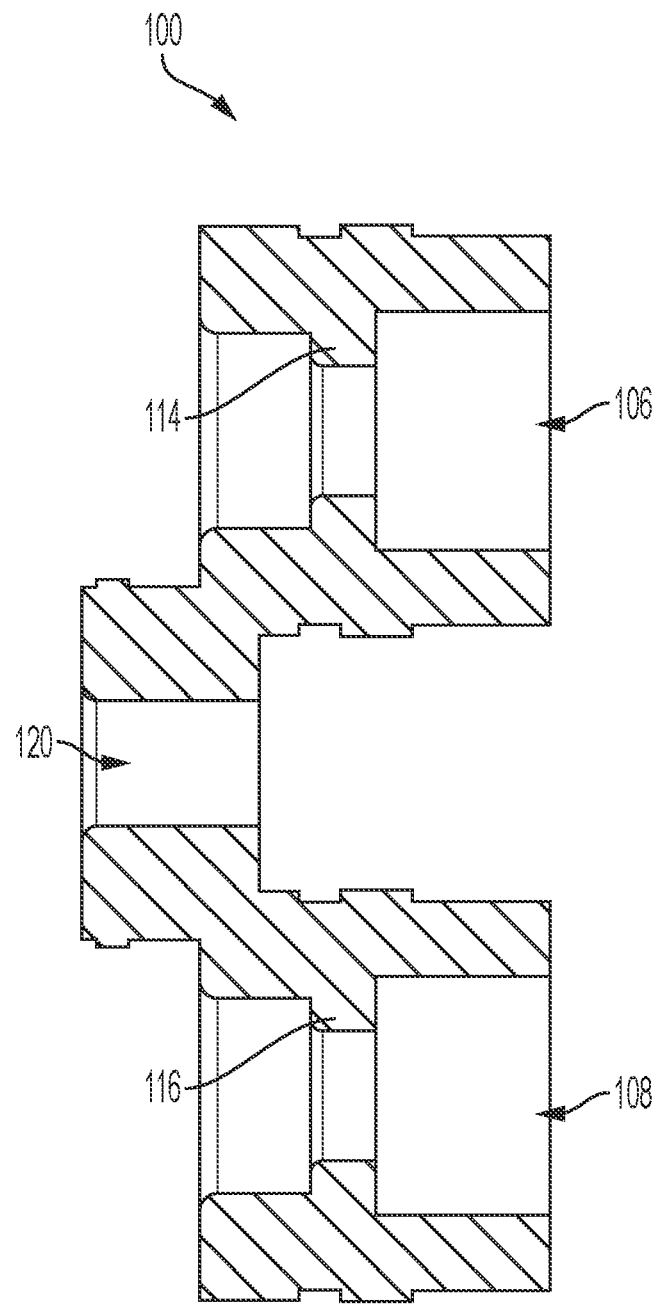
FIG. 4 is an elevation, cross-sectional view of an end rack link of the DREPS system.
Figure 5:
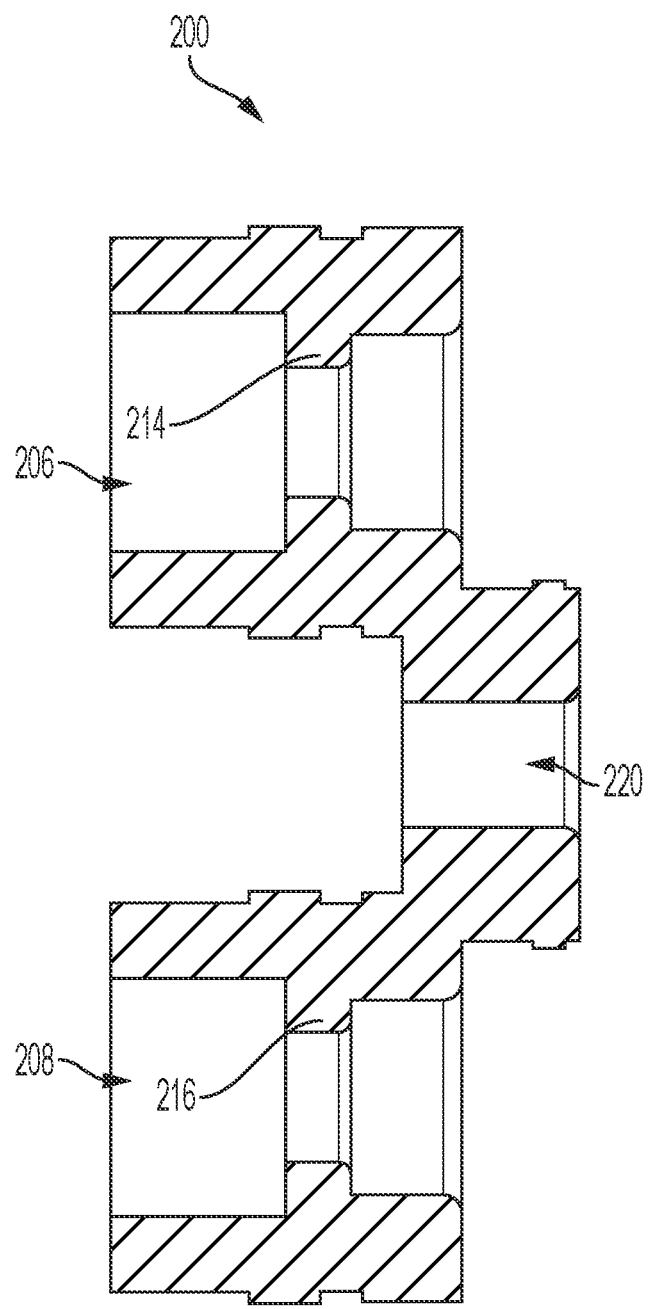
FIG. 5 is an elevation, cross-sectional view of another end rack link of the DREPS system.

Referring again to FIGS. 2 and 3, the rack bars 60, 62 are also structurally connected with a first end rack link 100 and a second end rack link 200. In particular, the first end rack link 100 couples the first rack bar 60 and the second rack bar 62 to each other at a first end 102 of the first rack bar 60 and at a first end 104 of the second rack bar 62. The first end rack link 100 also couples the first rack bar 60 and the second rack bar 62 to the first tie rod 38. The end rack links 100, 200 are illustrated in greater detail in FIGS. 4 and 5.

The first end rack link 100 includes a first counterbore 106 and a second counterbore 108. The first counterbore 106 receives the first end 102 of the first rack bar 60 and the second counterbore 108 receives the first end 104 of the second rack bar 62. In particular, an inner diameter of the wall defining first counterbore 106 is sized to receive the first end 102 of the first rack bar 60 therein. Similarly, the inner diameter of the wall defining the second counterbore 108 is sized to receive the first end 104 of the second rack bar 62 therein. A first mechanical fastener 110, such as a bolt or the like, extends into the first counterbore 106 and into the first end 102 of the first rack bar 60 to couple the first rack bar 60 to the first end rack link 100. Similarly, a second mechanical fastener 112, such as a bolt or the like, extends into the second counterbore 108 and into the first end 104 of the second rack bar 62 to couple the second rack bar 62 to the first end rack link 100. As shown, the first ends 102, 104 of the first rack bar 60 and the second rack bar 62 include a threaded recess that the respective mechanical fasteners 110, 112 thread into. Each counterbore 106, 108 includes a flange 114, 116 with an aperture that the mechanical fasteners 110, 112 extend through, with each mechanical fastener 110, 112 having a head larger than the aperture. The first end rack link 100 includes a threaded aperture 120 for receiving a threaded fastener 122 of the first tie rod 38 to couple the first end rack link 100 to the first tie rod 38. The threaded fastener 122 may be integrally formed with the first tie rod 38 or coupled thereto. Alternatively, the first end rack link 100 may include the threaded fastener 122 (either integrally formed or coupled thereto) for insertion into the first tie rod 38.

The second end rack link 200 is similar to the first end rack link 100, but is described in detail as follows. The second end rack link 200 couples the first rack bar 60 and the second rack bar 62 to each other at a second end 202 of the first rack bar 60 and at a second end 204 of the second rack bar 62. The second end rack link 200 also couples the first rack bar 60 and the second rack bar 62 to the second tie rod 40.

The second end rack link 200 includes a third counterbore 206 and a fourth counterbore 208. The third counterbore 206 receives the second end 202 of the first rack bar 60 and the fourth counterbore 208 receives the second end 204 of the second rack bar 62. In particular, an inner diameter of the wall defining third counterbore 206 is sized to receive the second end 202 of the first rack bar 60 therein. Similarly, the inner diameter of the wall defining the fourth counterbore 208 is sized to receive the second end 204 of the second rack bar 62 therein. A third mechanical fastener 210, such as a bolt or the like, extends into the third counterbore 206 and into the second end 202 of the first rack bar 60 to couple the first rack bar 60 to the second end rack link 200. Similarly, a fourth mechanical fastener 212, such as a bolt or the like, extends into the fourth counterbore 208 and into the second end 204 of the second rack bar 62 to couple the second rack bar 62 to the second end rack link 200. As shown, the second ends 202, 204 of the first rack bar 60 and the second rack bar 62 include a threaded recess that the respective mechanical fasteners 210, 212 thread into. Each counterbore 206, 208 includes a flange 214, 216 with an aperture that the mechanical fasteners 210, 212 extend through, with each mechanical fastener 210, 212 having a head larger than the aperture. The second end rack link 200 includes a threaded aperture 220 for receiving a threaded fastener 222 of the second tie rod 40 to couple the second end rack link 200 to the second tie rod 40. The threaded fastener 222 may be integrally formed with the second tie rod 40 or coupled thereto. Alternatively, the second end rack link 200 may include the threaded fastener 222 (either integrally formed or coupled thereto) for insertion into the second tie rod 40.

The housing 64 contains at least a portion of the first rack bar 60 and at least a portion of the second rack bar 62 and structurally connects them, while maintaining a desired radial spacing to arrange the rack bars 60, 62 in the above-described substantially parallel orientation. Each rack bar 60, 62, is surrounded by one or more sealing boots to maintain proper operation of the rack bar assembly 36. For example, a first sealing boot 90 surrounds a portion of the first rack bar 60 extending from the housing 64 to the first end rack link 100, a second sealing boot 92 surrounds a portion of the first rack bar 60 extending from the housing 64 to the second end rack link 200, a third sealing boot 94 surrounds a portion of the second rack bar 62 extending from the housing 64 to the first end rack link 100, and a fourth sealing boot 96 surrounds a portion of the second rack bar 62 extending from the housing 64 to the second end rack link 200.

The embodiments disclosed herein employ two racks 60, 62 disposed in parallel to facilitate narrow vehicle packages with a high output requirement in a small package. The end rack links 100, 200 allow for both the ball nut driven rack (i.e., second rack bar 62) and the operator driven rack (i.e., first rack bar 60) to travel sequentially and parallel to one another while transmitting load to the tie rods 38, 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rack bar assembly for a rack electric power steering system, the rack bar assembly comprising:
   a first rack bar extending axially;
   a second rack bar extending axially, wherein the first rack bar and the second rack bar are spaced a radial distance from each other and oriented parallel to each other; and
   a first end rack link coupling the first rack bar and the second rack bar to each other at a first end of the first rack bar and at a first end of the second rack bar, the first end rack link coupling the first rack bar and the second rack bar to a first tie rod assembly, wherein the first end rack link comprises a first counterbore and a second counterbore, wherein the first counterbore receives the first end of the first rack bar and the second counterbore receives the first end of the second rack bar, the rack bar assembly further comprising:
- a first mechanical fastener extending into the first counterbore and into the first end of the first rack bar to couple the first rack bar to the first end rack link; and
- a second mechanical fastener extending into the second counterbore and into the first end of the second rack bar to couple the second rack bar to the first end rack link.

2. The rack bar assembly of claim 1, wherein the first rack bar and the second rack bar are of the same axial length.

3. The rack bar assembly of claim 1, further comprising a housing containing at least a portion of the first rack bar and at least a portion of the second rack bar, the housing maintaining the radial distance between the first rack bar and the second rack bar.

4. The rack bar assembly of claim 3, wherein the housing is a single, integrally formed component.

5. The rack bar assembly of claim 4, wherein the housing is a cast housing.

6. The rack bar assembly of claim 1, further comprising a second end rack link coupling the first rack bar and the second rack bar to each other at a second end of the first rack bar and at a second end of the second rack bar, the second end rack link coupling the first rack bar and the second rack bar to a second tie rod assembly, the second end rack link comprising a third counterbore and a fourth counterbore, wherein the third counterbore receives the second end of the first rack bar and the fourth counterbore receives the second end of the second rack bar, the rack bar assembly further comprising:
- a third mechanical fastener extending into the third counterbore and into the second end of the first rack bar to couple the first rack bar to the second end rack link; and
- a fourth mechanical fastener extending into the fourth counterbore and into the second end of the second rack bar to couple the second rack bar to the second end rack link.

7. The rack bar assembly of claim 6, wherein the second end rack link comprises a threaded aperture for receiving a threaded fastener of the second tie rod assembly to couple the second end rack link to the second tie rod assembly.

8. The rack bar assembly of claim 6, further comprising:
- a housing containing at least a portion of the first rack bar and at least a portion of the second rack bar, the housing maintaining the radial distance between the first rack bar and the second rack bar;
- a first sealing boot surrounding a portion of the first rack bar extending from the housing to the first end rack link;
- a second sealing boot surrounding a portion of the first rack bar extending from the housing to the second end rack link;
- a third sealing boot surrounding a portion of the second rack bar extending from the housing to the first end rack link; and
- a fourth sealing boot surrounding a portion of the second rack bar extending from the housing to the second end rack link.

9. A rack bar assembly for a rack electric power steering system, the rack bar assembly comprising:
- a first rack bar extending axially;
- a second rack bar extending axially, wherein the first rack bar and the second rack bar are spaced a radial distance from each other and oriented parallel to each other; and
- a first end rack link coupling the first rack bar and the second rack bar to each other at a first end of the first rack bar and at a first end of the second rack bar, the first end rack link coupling the first rack bar and the second rack bar to a first tie rod assembly, wherein the first end rack link comprises a threaded aperture for receiving a threaded fastener of the first tie rod assembly to couple the first end rack link to the first tie rod assembly.

10. A rack electric power steering system comprising:
- a steering input shaft receiving a manual input from an operator;
- a pinion operatively coupled to the steering input shaft;
- a ball nut driven by a motor;
- a first rack bar having a tooth region in contact with the pinion, the first rack bar translated axially by the pinion;
- a second rack bar having a ball screw region in contact with the ball nut, the second rack bar translated axially by the ball nut, wherein the first rack bar and the second rack bar are spaced a radial distance from each other, are of the same axial length, and are oriented parallel to each other; and
- a housing that is a single, integrally formed structure and contains at least a portion of the first rack bar and at least a portion of the second rack bar, the housing maintaining the radial distance between the first rack bar and the second rack bar; and
- a first end rack link coupling the first rack bar and the second rack bar to each other at a first end of the first rack bar and at a first end of the second rack bar, the first end rack link coupling the first rack bar and the second rack bar to a first tie rod assembly, wherein the first end rack link comprises a first counterbore and a second counterbore, wherein the first counterbore receives the first end of the first rack bar and the second counterbore receives the first end of the second rack bar, the rack bar assembly further comprising:
  - a first mechanical fastener extending into the first counterbore and into the first end of the first rack bar to couple the first rack bar to the first end rack link; and
  - a second mechanical fastener extending into the second counterbore and into the first end of the second rack bar to couple the second rack bar to the first end rack link.

11. The rack electric power steering system of claim 10, further comprising a second end rack link coupling the first rack bar and the second rack bar to each other at a second end of the first rack bar and at a second end of the second rack bar, the second end rack link coupling the first rack bar and the second rack bar to a second tie rod assembly, the second end rack link comprising a third counterbore and a fourth counterbore, wherein the third counterbore receives the second end of the first rack bar and the fourth counterbore receives the second end of the second rack bar, the rack bar assembly further comprising:
- a third mechanical fastener extending into the third counterbore and into the second end of the first rack bar to couple the first rack bar to the second end rack link; and
- a fourth mechanical fastener extending into the fourth counterbore and into the second end of the second rack bar to couple the second rack bar to the second end rack link.

12. The rack electric power steering system of claim 11, wherein the second end rack link comprises a threaded aperture for receiving a threaded fastener of the second tie rod assembly to couple the second end rack link to the second tie rod assembly.

13. A rack electric power steering system comprising:
- a steering input shaft receiving a manual input from an operator;

a pinion operatively coupled to the steering input shaft;
a ball nut driven by a motor;
a first rack bar having a tooth region in contact with the pinion, the first rack bar translated axially by the pinion;
a second rack bar having a ball screw region in contact with the ball nut, the second rack bar translated axially by the ball nut, wherein the first rack bar and the second rack bar are spaced a radial distance from each other, are of the same axial length, and are oriented parallel to each other; and
a housing that is a single, integrally formed structure and contains at least a portion of the first rack bar and at least a portion of the second rack bar, the housing maintaining the radial distance between the first rack bar and the second rack bar; and
a first end rack link coupling the first rack bar and the second rack bar to each other at a first end of the first rack bar and at a first end of the second rack bar, the first end rack link coupling the first rack bar and the second rack bar to a first tie rod assembly, wherein the first end rack link comprises a threaded aperture for receiving a threaded fastener of the first tie rod assembly to couple the first end rack link to the first tie rod assembly.

* * * * *